May 13, 1941.　　　　G. McNALLY　　　　2,241,916
MILK COOLER AND STRAINER
Filed Oct. 15, 1938
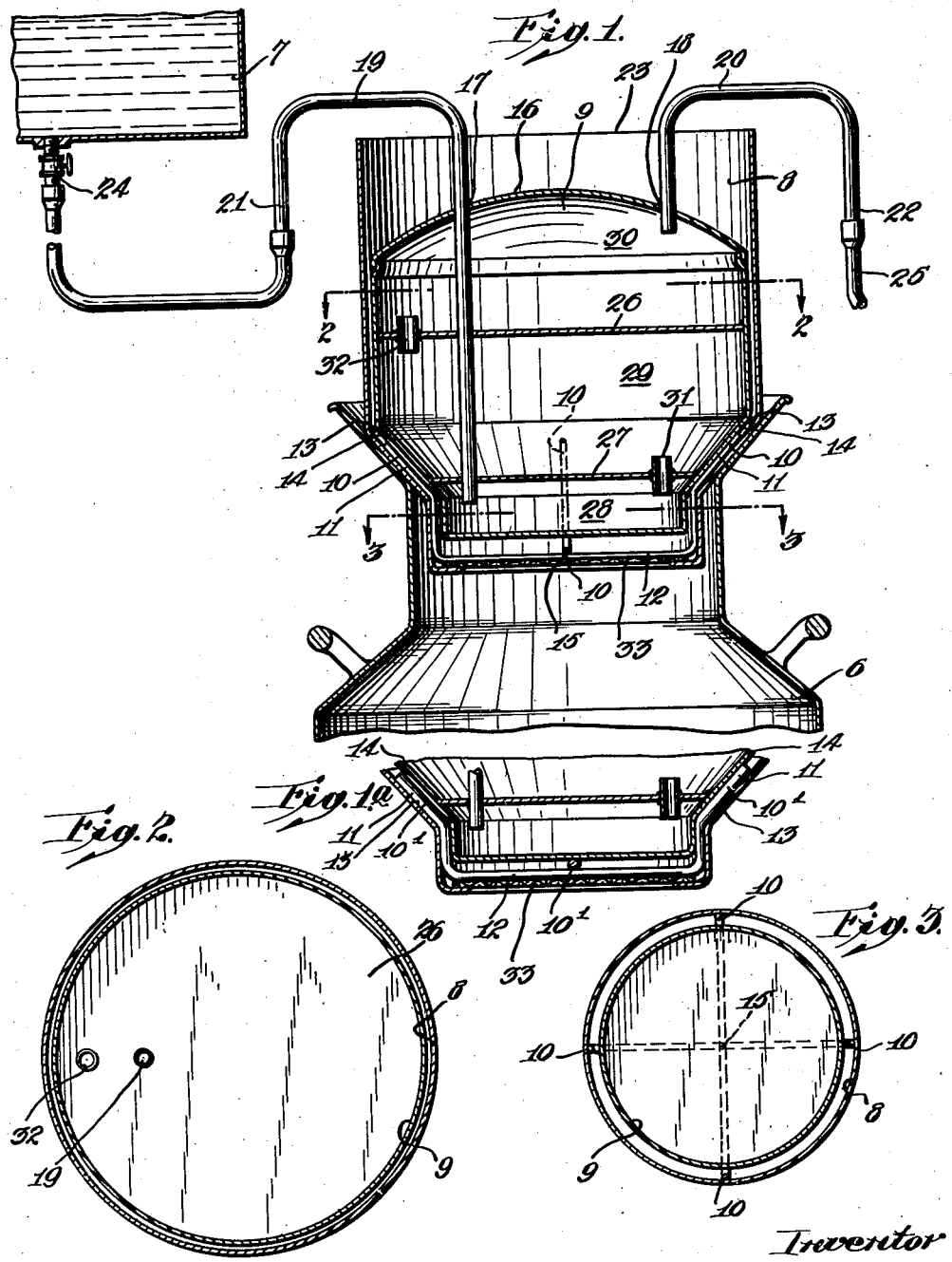
Witnesses:
Inventor
George McNally
Attorneys.

Patented May 13, 1941

2,241,916

UNITED STATES PATENT OFFICE 2,241,916

MILK COOLER AND STRAINER

George McNally, New Castle, Pa.

Application October 15, 1938, Serial No. 235,130

3 Claims. (Cl. 31—4)

My invention relates to a cooling and straining device believed to have its widest application for the cooling and straining of milk shortly after the milk has been drawn from the animal, but nevertheless intended for any use to which it may be adapted.

Because of its wide application in the cooling and straining of fresh milk, I have illustrated my device as applied to a conventional milk can, and herein use the term "milk" to cover broadly milk, cream and any other liquid suitably cooled by means of an embodiment of the present invention.

A purpose of the invention is to provide an effective and novel straining and cooling device to be made up of parts readily separable and capable of re-assembly, and with each part presenting to the milk, surfaces that are everywhere smooth and easily accessible for easy and thorough washing of every part.

A further purpose is to deliver the warm unstrained milk upon a cold smooth dome of a cooler, to cool the milk by passing it in a thin annular sheet down the dome and the external surface of the cooler and to strain the milk after it has been cooled and below the cooler.

A further purpose is to secure a more effective cooling of the milk by providing a cooler surrounded by milk within a milk receiving strainer reservoir with continuous flow of cooling water through the cooler in a direction generally counter to the flow of milk outside the cooler.

A further purpose is to divide the cooler horizontally into compartments with successively staggered connections between successive compartments, using the division plates to insure generally counter-current flows of cooling water and milk.

A further purpose is to provide novel means for readily spacing the outside of the cooler and the inside of a milk receiving strainer reservoir so that the milk passing down between the surfaces may form everywhere thin concentric sheets outside the cooler.

Further purposes will appear in the specification and in the claims.

I have elected to illustrate one only of the many forms of my invention, selecting a form however that is practical and efficient in operation and which well illustrates the principles involved.

Figure 1 is a broken sectional elevation showing a desirable embodiment of my invention applied to a conventional milk can and with parts in operating position for cooling and straining fresh milk delivered to the device and discharging therefrom into the can.

Figure 1a is a broken fragment of Figure 1, showing a different spacing between the milk reservoir and the cooling drum.

Figures 2 and 3 are horizontal sections of Figure 1 taken respectively upon the lines 2—2 and 3—3 thereof in the direction of the arrows and omitting the can.

Like numerals refer to like parts in all figures.

Describing in illustration and not in limitation and referring to the drawing:

Figure 1 shows a desirable embodiment of my invention in place on a milk can 6 and with connections to a source 7 of cooling water for continuous "counter-flow" of cooling water through the cooler.

As illustrated, my cooler and strainer device comprises parts that are everywhere smooth for effective and easy washing and that are very easily assembled for use and after each use very easily separated for washing.

These parts include a milk strainer reservoir 8, straining into the milk can, a cooler 9 inside the reservoir and wires 10 or 10' inside the reservoir 8 and which support and separate the cooler from the inside of the reservoir.

The cooler 9 in its outside diametral dimensions is a little smaller than the inside of the reservoir to provide a thin annular channel down between the outside of the seated cooler and the inside of the reservoir.

Each of two wires 10 in Figures 1 and 3 includes oppositely flaring ends 11 and a U-shaped body 12, so that, when one of the wires 10 is dropped to place in the reservoir, the ends 11 rest on a downwardly converging shoulder 13 of the reservoir at opposite sides of the reservoir and in position to support the cooler upon opposite sides of a correspondingly downwardly converging shoulder 14 of its outside wall.

As shown, two similar wires are used in the form of Figures 1 to 3, providing support for the cooler at four points about the slope periphery. The wires effectively form a cross 15 as shown in Figure 3.

The size of the wires will be changed to increase or reduce the length of time that the milk undergoes the cooling treatment by increasing or reducing the space between the reservoir and the cooler through which the milk will flow. Figure 1a shows larger sized wires 10' in place, giving wider spacing between the reservoir and the cooling drum.

I make the milk-engaging surfaces of both the milk reservoir and of the cooler everywhere smooth and free from sharp corners and from abrupt angles, preferably die-pressing the parts to the desired contours.

The cooler 9 presents at the top a smooth dome 16 having openings 17 and 18 through which extend cooling water inlet and outlet pipes 19 and 20, suitably soldered to the dome, and which pipes are provided with return down bends to present inlet and outlet ends respectively at 21 and 22 that are outwardly and downwardly beyond the top edge 23 of the milk reservoir. The hose connections at 21 and 22 respectively to a cold water supply valve 24 from the source 7 and to a waste connection 25 are thus located where they may not inadvertently drip into the milk reservoir when connecting or disconnecting the hose members to and from the cooler.

Within the cooler the inlet pipe 19 is extended down to near the bottom of the cooler through baffle plates 26 and 27. These baffle plates divide the cooler interior into lower, middle and upper compartments 28, 29 and 30 respectively. The lower compartment 28 connects into the middle compartment through an open nipple 31 at the opposite side of the cooler from the outlet end of the water inlet pipe, and the middle compartment 29 connects to the upper compartment 30 through an open nipple 32 on the opposite side of the cooler from the inlet into the middle compartment through the nipple 31.

In the same way the outlet pipe 20 has its inlet within the upper compartment 30 located toward the opposite side of the cooler from the water inlet to the upper compartment at the nipple 32, the intent being to have the cooling water flow through the cooler along an upward zigzag path and generally in counterdirection to the downward flow of milk about the outside of the cooler, thereby securing more effective use of cooling water and permitting the use of less cooling water than would be otherwise necessary—a matter often of very considerable importance.

The strainer 33 lies in the bottom of the milk reservoir 8 and is downwardly pressed by the wires 10 or 10'.

The cooler will desirably be assembled as a unit by soldering or other suitable means of construction. Tinned copper is a suitable construction material.

In operation the clean parts are accurately assembled by placing the wires 10 or 10' in the reservoir, setting the cooler atop of the supporting and separating portions of the wires, then setting the reservoir in the open top and neck of a milk can 6.

The cooling water supply and discharge pipes 19 and 20 are connected at 21 and 22 respectively to the source of cold water and to waste—letting the cold water flow continuously through the cooler.

The warm milk, fresh from the animal, poured on top of the smooth cold dome 16 of the cooler flows down slowly over the dome and in a thin annular sheet downward between the cold outside of the cooler 9 and the surface of the milk reservoir 8 to pass ultimately out the strainer 33 into the milk can 6.

The milk is cooled promptly after milking to retard the growth of bacteria and the formation of lactic acid. The warm milk in the top of the reservoir also has the effect of protecting the cooler milk below from odors and bacteria of the air.

As the progressively cooling milk slowly passes from the somewhat less cold smooth dome top to the extreme bottom of the cooler, it comes in contact with progressively more cold surfaces of the cooler—the cold water entering the cooler at the bottom and flowing generally counter-flow to the milk to leave at the top after travelling progressively back and forth upwardly through every portion of the cooler.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:

1. In a milk cooler and strainer, a milk reservoir having a strainer outlet and adapted to sit in the open end of a milk can or the like, a cooling drum having a smooth cooling dome and adapted to sit inside the reservoir above the strainer outlet, the reservoir and drum having intermediate their heights opposed downwardly converging inside and outside shoulders and means intermediate the said opposing shoulders supporting and separating the drum from the reservoir, the said means including a wire below the drum and having reversely flaring ends and intermediate the ends a U bend, the ends seating the drum by resting on the inside of the reservoir at opposite sides on its said downwardly converging shoulder.

2. In a milk cooler and strainer, a milk reservoir having a strainer outlet and adapted to sit in the open end of a milk can or the like, a cooling drum having a smooth cooling dome and adapted to sit inside the reservoir above the strainer outlet, the reservoir and drum having intermediate their heights opposed downwardly converging inside and outside shoulders and means intermediate the said opposing shoulders supporting and separating the drum from the reservoir, the said means including a pair of wires, the wires located to cross below the drum and each wire having reversely flaring ends and intermediate the ends a U bend, the ends seating the drum by resting on the inside of the reservoir at opposite sides on its said downwardly converging shoulder.

3. In a milk cooler and strainer, a milk reservoir open at the bottom having an upper enlarged cylindrical portion, a lower reduced cylindrical portion adapted to extend into the neck of the milk can and a shoulder connecting the upper and lower cylindrical portions and adapted to engage the flaring upper portion of the neck of the milk can, a strainer covering the open bottom of the milk reservoir, a cooling drum having an upper enlarged cylindrical portion, a lower reduced cylindrical portion and an intermediate shoulder slightly smaller than the corresponding upper and lower cylindrical portions and shoulder portion of the milk reservoir and fitting inside the milk reservoir while leaving a thin annular space for milk flow between the milk reservoir and the cooling drum and a detachable wire extending in a general diametral direction completely across the bottom of the cooling drum in the space between the cooling drum and the milk reservoir and extending in a general outward direction between the shoulder of the cooling drum and the shoulder of the reservoir at opposite points on the shoulders, the thickness of the wire determining the spacing provided for milk flow at the shoulders.

GEORGE McNALLY.